United States Patent
Isogai et al.

(10) Patent No.: US 9,136,032 B2
(45) Date of Patent: Sep. 15, 2015

(54) CATHODE MATERIAL

(71) Applicant: HONDA MOTOR CO., LTD., Tokyo (JP)

(72) Inventors: Yuji Isogai, Wako (JP); Shintaro Aoyagi, Wako (JP); Kaoru Omichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 14/052,804

(22) Filed: Oct. 14, 2013

(65) Prior Publication Data

US 2014/0103263 A1    Apr. 17, 2014

(30) Foreign Application Priority Data

Oct. 16, 2012  (JP) ................................. 2012-228826
Aug. 21, 2013  (JP) ................................. 2013-171367

(51) Int. Cl.
| | | |
|---|---|---|
| *H01B 1/08* | (2006.01) | |
| *H01M 4/36* | (2006.01) | |
| *H01M 4/13* | (2010.01) | |
| *H01M 4/485* | (2010.01) | |
| *H01M 4/58* | (2010.01) | |
| *H01M 4/62* | (2006.01) | |

(52) U.S. Cl.
CPC . *H01B 1/08* (2013.01); *H01M 4/13* (2013.01); *H01M 4/364* (2013.01); *H01M 4/485* (2013.01); *H01M 4/582* (2013.01); *H01M 4/625* (2013.01); *Y02E 60/122* (2013.01)

(58) Field of Classification Search
CPC .............. H01B 1/00; H01B 1/06; H01B 1/08; H01B 1/20; H01M 4/364; H01M 4/58; H01M 4/131
See application file for complete search history.

(56) References Cited

U.S. PATENT DOCUMENTS

2013/0029207 A1 *  1/2013  Jain ............................... 429/163

FOREIGN PATENT DOCUMENTS

| CN | 101901936 B | * | 2/2012 |
|---|---|---|---|
| JP | 06-290779 | | 10/1994 |
| JP | 09022698 A | * | 1/1997 |
| JP | 2008-130265 | | 6/2008 |
| WO | 03/026054 | | 3/2003 |

OTHER PUBLICATIONS

Kendrick et al "Conducting Solids", Annu. Rep. Prog. Chem., Sect. A, 2010, 106, 429-457.*

* cited by examiner

*Primary Examiner* — Mark Kopec
(74) *Attorney, Agent, or Firm* — Rankin, Hill & Clark LLP (57) ABSTRACT

Provided is a cathode material capable of obtaining high energy density and superior instantaneous output characteristics in a lithium ion secondary battery. The cathode material is used in a lithium ion secondary battery (1), and includes $FeF_3$ and $LiV_3O_8$ as a cathode active material. A mass ratio of $FeF_3$ to $LiV_3O_8$ of the cathode material is in a range of 86:14 to 43:57. The cathode material further comprises a conductive auxiliary.

5 Claims, 5 Drawing Sheets

CATHODE MATERIAL

BACKGROUND OF THE INVENTION

1. Field of the Invention

The present invention relates to a cathode material.

2. Description of the Related Art

It is desired that secondary batteries for electric vehicles have a high energy density to increase driving distance and also have excellent output characteristics when the current density instantaneously changes during high speed running or hill-climbing (hereinbelow, sometimes referred to as an instantaneous output characteristics).

Heretofore, nickel-hydrogen secondary batteries comprising two active materials different in charge and discharge characteristics, that is, a high-output type cathode active material and a low-output type cathode active material have been known as secondary batteries having high energy density and excellent instantaneous output characteristics. The nickel-hydrogen secondary batteries have nickel hydroxide as a cathode active material, and comprise a high-output type cathode active material and a low-output type cathode active material that have different masses of the nickel hydroxide (for example, refer to WO2003/026054).

However, conventional technique mentioned above is an invention related to nickel-hydride secondary battery, and the above-mentioned patent document does not disclose or suggest a lithium ion secondary battery.

SUMMARY OF THE INVENTION

In view of the circumstances, it is thus the object of the present invention to provide a cathode material that is able to achieve a high energy density as well as excellent instantaneous output characteristics in lithium ion secondary batteries.

In order to accomplish the above-mentioned object, the present invention provides a cathode material for a lithium ion secondary battery, containing $FeF_3$ and $LiV_3O_8$ as a cathode active material.

Of the cathode active materials used in the lithium ion secondary battery, $FeF_3$ is known to have a theoretical energy density of approximately 240 mAh/g (for example, refer to Japanese Patent Application Laid-Open No. 2008-130265). However, $FeF_3$ requires time for reaction with lithium ion in the cathode, so that it cannot be said that it is superior in the instantaneous output characteristics.

Further, as the cathode active material to be used in the lithium ion secondary battery, $LiV_3O_8$ is known (for example, refer to Japanese Patent Application Laid-Open No. H6-290779). $LiV_3O_8$ may easily disperse lithium ions in the cathode of the lithium ion secondary battery, and is superior in the instantaneous output characteristics. However, it cannot be said that $LiV_3O_8$ is equipped with a sufficient energy density.

However, according to the cathode material of the present invention, in the lithium ion secondary battery, an effect more than a sum of effect according to a ratio of $FeF_3$ and $LiV_3O_8$ may be obtained, from a point of obtaining high energy density and also obtaining superior instantaneous output characteristics.

The reason for being able to obtain the effect more than the sum of the effect according to the ratio of $FeF_3$ and $LiV_3O_8$ in the cathode material of the present invention may be considered as follows. Since reaction potential in a cathode reaction of $FeF_3$ and $LiV_3O_8$ differs, lithium ions are transferred and received between the two. As a result, in $FeF_3$, it is considered that it is possible to promptly progress the cathode reaction from the lithium ions supplied from $LiV_3O_8$, and that it is possible to make portion that could not be used to the cathode reaction independently contribute to the cathode reaction.

Further, in the cathode material of the present invention, a mass ratio of $FeF_3$ to $LiV_3O_8$ is preferably within a range of 86:14 to 43:57, so that high energy density and superior instantaneous output characteristics may be obtained for certain.

In a case where the mass ratio of $FeF_3$ and $LiV_3O_8$ deviates from the above-mentioned range, either one or both of high energy density and superior instantaneous output characteristics may not be obtained.

Further, the cathode material of the present invention preferably contains a conductive auxiliary. By containing the conductive auxiliary, the cathode material of the present invention may perform transfer of electric charges more easily.

The cathode material of the present invention preferably contains $FeF_3$ in a range of 30 to 70% by mass, $LiV_3O_8$ in a range of 10 to 60% by mass, and the conductive auxiliary in a range of 5 to 30% by mass, and wherein a sum of $FeF_3$, $LiV_3O_8$ and the conductive auxiliary is 100% by mass. Further, the cathode material of the present invention preferably contains $FeF_3$ in a range of 30 to 60% by mass, $LiV_3O_8$ in a range of 10 to 40% by mass, and the conductive auxiliary in a range of 20 to 30% by mass, and wherein a sum of $FeF_3$, $LiV_3O_8$ and the conductive auxiliary is 100% by mass.

The cathode material of the present invention may perform transfer of electric charges more easily and surely, by having a composition of $FeF_3$, $LiV_3O_8$ and the conductive auxiliary in the above-mentioned range. In a case where the composition of $FeF_3$, $LiV_3O_8$ and the conductive auxiliary deviates from the above-mentioned range, the transfer of the electric charges may be interfered.

DETAILED DESCRIPTION OF THE PREFERRED EMBODIMENTS

Next, embodiments of the present invention will be described in more detail below with reference to the accompanying drawings.

Figure 1:
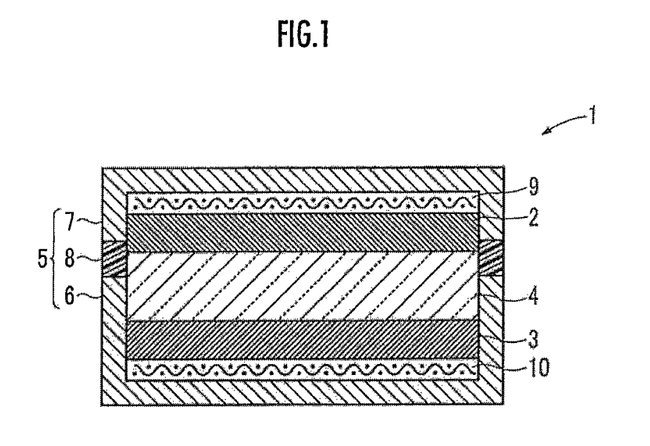
FIG. 1 is a cross-sectional frame format showing one configuration example of a lithium ion secondary battery using a cathode material according to the present invention.

A cathode material of the present invention is used, for example, in a lithium ion secondary battery 1 shown in FIG. 1. The lithium ion secondary battery 1 is configured of a positive electrode 2 having $FeF_3$ and $LiV_3O_8$ as a cathode active material, a negative electrode 3 having a metallic lithium as an anode active material, and an electrolyte layer 4 disposed between the positive electrode 2 and the negative electrode 3.

The positive electrode 2, the negative electrode 3, and the electrolyte layer 4 are hermetically housed in a case 5. The case 5 includes a cup-form case body 6 and a lid body 7 to cover the case body 6, and an insulating resin 8 is interposed between the case body 6 and the lid body 7. The positive electrode 2 has a cathode current collector 9 between the positive electrode 2 and a top surface of the lid body 7, and the negative electrode 3 has a negative electrode current collector 10 between the negative electrode 3 and the bottom surface of the case body 6. In the lithium ion secondary battery 1, the case body 6 acts as a negative plate, and the lid body 7 acts as a positive plate.

In the lithium ion secondary battery 1, the positive electrode 2 is made of a cathode material having $FeF_3$ and $LiV_3O_8$ as the cathode active material and a conductive auxiliary, and a binder. As the conductive auxiliary, for example, carbon materials such as carbon black, acetylene black, Ketjen black, carbon nanotube, grapheme, and activated carbon, and a conductive polymer (PEDOT), and the like, may be given. Further, as the binder, polytetrafluoroethylene (PTFE) and the like may be given.

The cathode material is made of $FeF_3$ in a range of 30 to 70% by mass, $LiV_3O_8$ in a range of 10 to 60% by mass, and the conductive auxiliary in a range of 5 to 30% by mass, and is made so that it becomes 100% by mass as a whole.

The cathode material may be produced, for example, as follows. First, $FeF_3$ and the conductive auxiliary are mixed to prepare a first mixture. Although the mixing can be performed with a ball mill or a homogenizer, a ball mill is preferably used when $FeF_3$ or the conductive auxiliary is pulverized and mixed as well as ground to particulates.

Next, a second mixture is prepared by mixing $LiV_3O_8$ and the conductive auxiliary. The mixing may be performed, similar to the case of the first mixture, using the ball mill or the homogenizer, and the ball mill is preferably used in the case of pulverizing and mixing while grinding to particulates.

In the present specification, regardless of its composition, a mixture of $FeF_3$ and the conductive auxiliary is called a first mixture, and a mixture of $LiV_3O_8$ and the conductive auxiliary is called a second mixture.

Next, by mixing the first mixture and the second mixture, so that $FeF_3$ and $LiV_3O_8$ and the conductive auxiliary becomes a desired mass ratio, the cathode material may be obtained. The positive material may be made into the positive electrode 2, by further mixing with the binder and then by compacting.

As explained above, by mixing $FeF_3$ and $LiV_3O_8$ that are preliminarily mixed with the conductive auxiliary, it becomes possible to increase the adhesion amount of the conductive auxiliary to $FeF_3$ and $LiV_3O_8$, compared to a case where $FeF_3$ and $LiV_3O_8$ are mixed with the conductive auxiliary at a same time, so that it becomes possible to improve conductivity.

As the negative electrode 3, for example, metal lithium, lithium alloy and the like are usable.

As the electrolyte layer 4, for example, a separator impregnated with a non-aqueous electrolyte solution in which lithium salt is dissolved in a non-aqueous solvent may be given. As the lithium salt, for example, lithium hexafluorophosphate ($LiPF_6$) and the like may be given, and as the non-aqueous solvent, for example, a mixed solvent of ethylene carbonate and diethyl carbonate, and the like, may be given.

Next, as the current collectors 9, 10, a mesh of titanium, stainless steel, nickel, aluminum, copper and the like is usable.

The positive electrode 2 of the present embodiment contains $FeF_3$ and $LiV_3O_8$ as the cathode active material. A reaction potential in a cathode reaction of $FeF_3$ is approximately 1.7 to 3.2 V with respect to $Li/Li^-$, and that of $LiV_3O_8$ is approximately 2.5 to 3.5 V with respect to $Li/Li^+$. It becomes possible to transfer and receive lithium ions between $FeF_3$ and $LiV_3O_8$, from the reaction potential in the cathode reaction being different among the two.

As a result, $FeF_3$ may progress the cathode reaction promptly from the lithium ions provided by $LiV_3O_8$, and also make portions that cannot be used in the cathode reaction independently contribute to the cathode reaction.

Therefore, the positive electrode 2 of the present embodiment is capable of obtaining an effect equal to or more than a sum of the effect according to a ratio of $FeF_3$ and $LiV_3O_8$, when used in the lithium ion secondary battery 1, and is capable of obtaining high energy density and superior instantaneous output characteristics.

Further, the positive electrode 2 of the present embodiment may perform transfer of charge more easily, by containing the conductive auxiliary.

Next, Examples and Comparative Examples of the present invention will be described.

EXAMPLE 1

[1. Preparation of Lithium Ion Secondary Battery]

In the present example, first, a first mixture was prepared by pulverizing and mixing 1 g of $FeF_3$ powder (made by Sigma-Aldrich Corporation), and 0.429 g of Ketjen black (made by Lion Corp., trade name: Ketjen black EC600JD) as a conductive auxiliary, using a ball mill at a rotation frequency of 360 rpm for 1 hour.

Next, a first solution was prepared by dissolving 1.22 g of $NH_4VO_3$ into 150 mL of ion-exchanged water heated to 60 to 80° C. Next, a second solution was prepared by dissolving 0.688 g of $CH_3COOLi$ and 20.03 g of citric acid ($C_6H_8O_7$) into 150 mL of ion-exchanged water.

Next, after mixing the obtained first solution and the second solution, and neutralizing the obtained mixed solution to around pH 6 with ammonia water, a blue-colored solution was obtained by reacting under 60° C. for 12 hours, while stirring with a stirrer. Next, $LiV_3O_8$ precursor was obtained by vacuum drying the obtained blue-colored solution under the temperature of 120° C. for 12 hours.

Next, approximately 3 g of $LiV_3O_8$ was prepared by calcining the obtained $LiV_3O_8$ precursor under the temperature of 400° C. for 10 hours.

Next, a second mixture was prepared by pulverizing and mixing 1 g of obtained $LiV_3O_8$ and 0.429 g of Ketjen black using a ball mill at a rotation frequency of 360 rpm for one hour.

Next, the cathode material was prepared by mixing 15 mg of the first mixture and 15 mg of the second mixture. The cathode material obtained in the present example contains $FeF_3$, $LiV_3O_8$ and Ketjen black at the mass ratio of 35:35:30, and the mass ratio of $FeF_3$ to $LiV_3O_8$ is 50:50.

Next, 30 mg of the obtained cathode material and an emulsion containing 3.4 mg of polytetrafluoroethylene (PTFE) were mixed in the agate mortar, and compacted to a pellet-shape by a powder compacting machine. Next, the mixture of the cathode material and PTFE compacted in a pellet-shape was pressure bonded to the cathode current collector 9 comprised of an aluminum mesh of 15 mm in diameter, so as to obtain the positive electrode 2.

Next, a lithium foil of 15 mm in diameter and 0.5 mm in thickness was bonded to the negative current collector 10 made of a SUS plate of 0.3 mm in thickness with a SUS mesh of 100 mesh being welded, so as to obtain the negative electrode 3.

Next, the negative electrode 3 was disposed inside the SUS-made case body 6 of a bottomed cylinder form, so that the negative electrode current collector 10 contacted a bottom surface of the case body 6, and a separator comprised of a polypropylene microporous membrane of 0.25 mm in thickness was superposed on the negative electrode 3. Next, the positive electrode 2 and the cathode current collector 9 obtained as explained above were superposed on the separator, so that the positive electrode 2 contacted the separator. Next, a non-aqueous electrolyte solution was injected into the separator, to thereby form the electrolyte layer 4.

As the non-aqueous electrolyte solution, a solution was used in which lithium hexafluorophosphate ($LiPF_6$) as a supporting salt was dissolved in a concentration of 1 mol/l in a mixed solvent of ethylene carbonate and diethyl carbonate mixed in a mass ratio of 3:7.

Next, a laminate body composed of the negative electrode current collector 10, the negative electrode 3, the electrolyte layer 4, the positive electrode 2, and the cathode current collector 9 housed in the case body 6 was covered with the SUS-made lid body 7. At this time, a ring-shaped insulating resin 8 was disposed between the case body 6 and the lid body 7, so as to obtain the lithium ion secondary battery 1 shown in FIG. 1.

[2. Evaluation of Energy Density]

Figure 2:
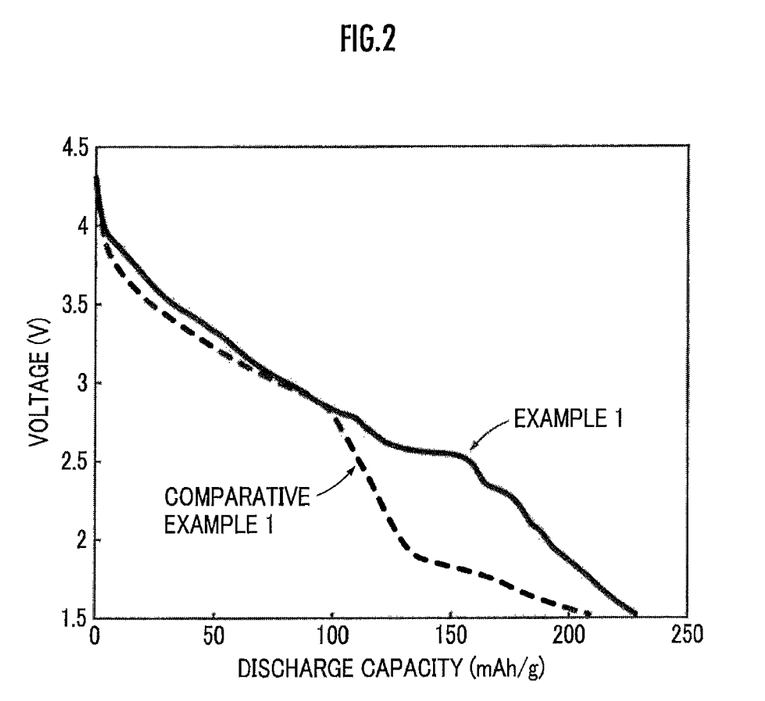
FIG. 2 is a graph showing a relationship between a discharge capacity and voltage of the lithium ion secondary batteries obtained in the example.

Next, the lithium ion secondary battery 1 obtained in the present example was used, and a discharge test was performed in an atmosphere of room temperature (25° C.), with a voltage in a range of 1.5 to 4.35 V with respect to $Li/Li^+$ and a current density of 0.1 $mA/cm^2$. The relationship between the discharge capacity and the voltage is shown in FIG. 2. Further, an average discharge voltage, the discharge capacity, and the energy density are shown in Table 1. The discharge capacity and the energy density are values converted to per unit mass of the cathode material.

[3. Evaluation of Cycle Performance]

Figure 3:
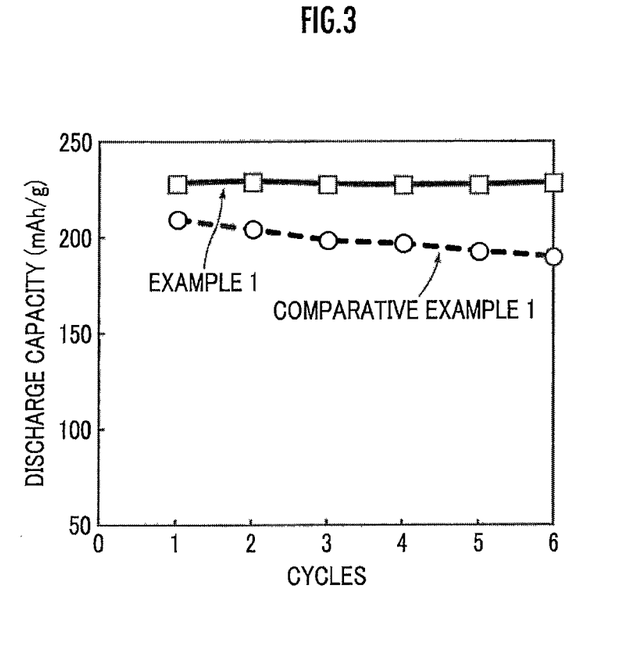
FIG. 3 is a graph showing a cycle performance of the lithium ion secondary batteries obtained in the example.

Next, the lithium ion secondary battery 1 obtained in the present example was used, and a cycle performance was measured by repeating charge and discharge in the atmosphere of room temperature (25° C.) with the voltage in the range of 1.5 to 4.35 V with respect to $Li/Li^+$ and the current density of 0.1 $mA/cm^2$ for 6 cycles. The discharge capacity after completion of each cycle is shown in FIG. 3.

[4. Evaluation of Instantaneous Output Characteristics]

Figure 4:
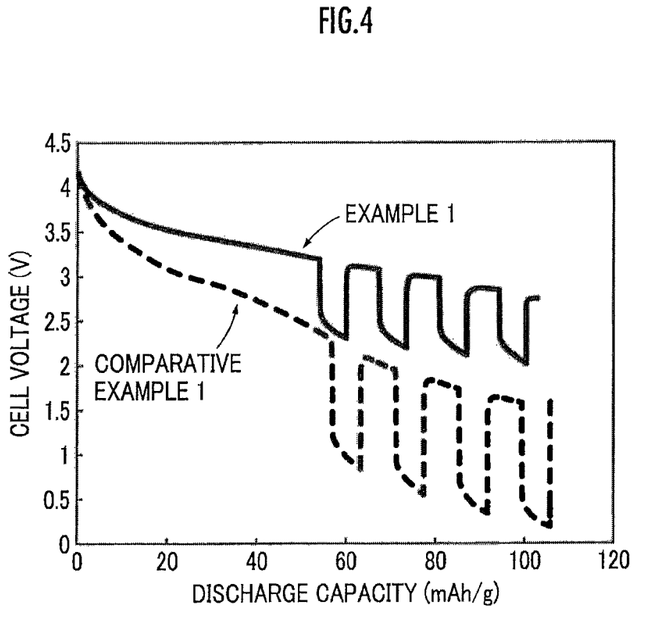
FIG. 4 is a graph showing an instantaneous output characteristics of the lithium ion secondary batteries obtained in the example.

Next, the lithium ion secondary battery 1 obtained in the present example was used, and the battery was charged in the atmosphere of room temperature (25° C.) at a constant current density of 0.2 $mA/cm^2$ to the voltage of 4.25 V with respect to $Li/Li^+$. Next, after discharging for 200 minutes at the constant current density of 0.2 $mA/cm^2$, and discharging for 1 minute at the constant current density of 5.0 $mA/cm^2$, a voltage drop (hereinafter referred to as IR drop) when the current density is changed from 0.2 $mA/cm^2$ to 5.0 $mA/cm^2$ was measured. The operation for measuring the IR drop was performed 4 times. As the instantaneous output characteristics, a relationship between the discharge capacity and the voltage is shown in FIG. 4.

EXAMPLE 2

In the present example, the cathode material was prepared exactly as in Example 1, except that 25.71 mg of the first mixture and 4.29 mg of the second mixture were mixed. The cathode material obtained in the present example contained $FeF_3$, $LiV_3O_8$ and Ketjen black at the mass ratio of 60:10:30, and the mass ratio of $FeF_3$ to $LiV_3O_8$ is 86:14.

Next, the lithium ion secondary battery 1 shown in FIG. 1 was obtained exactly as in Example 1, except that the cathode material obtained in the present example was used.

Next, the discharge test was performed exactly as in Example 1, except that the lithium ion secondary battery 1 obtained in the present example was used. The average discharge voltage, the discharge capacity, and the energy density are shown in Table 1.

EXAMPLE 3

In the present example, the cathode material was prepared exactly as in Example 1, except that 21.43 mg of the first mixture and 8.57 mg of the second mixture were mixed. The cathode material obtained in the present example contained $FeF_3$, $LiV_3O_8$ and Ketjen black at the mass ratio of 50:20:30, and the mass ratio of $FeF_3$ to $LiV_3O_8$ is 71:29.

Next, the lithium ion secondary battery 1 shown in FIG. 1 was obtained exactly as in Example 1, except that the cathode material obtained in the present example was used.

Next, the discharge test was performed exactly as in Example 1, except that the lithium ion secondary battery 1 obtained in the present example was used. The average discharge voltage, the discharge capacity, and the energy density are shown in Table 1.

EXAMPLE 4

In the present example, the cathode material was prepared exactly as in Example 1, except that 17.14 mg of the first mixture and 12.86 mg of the second mixture were mixed. The cathode material obtained in the present example contained $FeF_3$, $LiV_3O_8$ and Ketjen black at the mass ratio of 40:30:30, and the mass ratio of $FeF_3$ to $LiV_3O_8$ is 57:43.

Next, the lithium ion secondary battery 1 shown in FIG. 1 was obtained exactly as in Example 1, except that the cathode material obtained in the present example was used.

Next, the discharge test was performed exactly as in Example 1, except that the lithium ion secondary battery 1 obtained in the present example was used. The average discharge voltage, the discharge capacity, and the energy density are shown in Table 1.

EXAMPLE 5

In the present example, the cathode material was prepared exactly as in Example 1, except that 12.86 mg of the first mixture and 17.14 mg of the second mixture were mixed. The cathode material obtained in the present example contained $FeF_3$, $LiV_3O_8$ and Ketjen black at the mass ratio of 30:40:30, and the mass ratio of $FeF_3$ to $LiV_3O_8$ is 43:57.

Next, the lithium ion secondary battery 1 shown in FIG. 1 was obtained exactly as in Example 1, except that the cathode material obtained in the present example was used.

Next, the discharge test was performed exactly as in Example 1, except that the lithium ion secondary battery 1 obtained in the present example was used. The average discharge voltage, the discharge capacity, and the energy density are shown in Table 1.

EXAMPLE 6

In the present example, first, the first mixture was prepared exactly as in Example 1, except that 1 g of $FeF_3$ and 0.25 g of Ketjen black were mixed.

Next, the second mixture was prepared exactly as in Example 1, except that 1 g of $LiV_3O_8$ and 0.25 g of Ketjen black were mixed.

Next, the cathode material was prepared by mixing 15 mg of the first mixture and 15 mg of the second mixture. The cathode material obtained in the present example contained $FeF_3$, $LiV_3O_8$ and Ketjen black at the mass ratio of 40:40:20, and the mass ratio of $FeF_3$ to $LiV_3O_8$ is 50:50.

Next, the lithium ion secondary battery 1 shown in FIG. 1 was obtained exactly as in Example 1, except that the cathode material obtained in the present example was used.

Next, the discharge test was performed exactly as in Example 1, except that the lithium ion secondary battery 1 obtained in the present example was used. The average discharge voltage, the discharge capacity, and the energy density are shown in Table 1.

COMPARATIVE EXAMPLE 1

The lithium ion secondary battery 1 shown in FIG. 1 was obtained wholly the same as in Example 1, except that 30 mg of a cathode material consisting only of the first mixture was used in the present comparative example. The cathode material of the present comparative example includes $FeF_3$ and Ketjen black at the mass ratio of 70:30.

Next, the discharge test was performed wholly the same as in Example 1, except that the lithium ion secondary battery 1 obtained in the present comparative example was used. The relationship between the discharge capacity and the voltage is shown in FIG. 2. Further, the discharge capacity, the average discharge voltage, and the energy density are shown in Table 1.

Next, the cycle performance was measured wholly the same as in Example 1, except that the lithium ion secondary battery 1 obtained in the present comparative example was used. The discharge capacity after completion of each cycle is shown in FIG. 3.

Next, the IR drop was measured wholly the same as in Example 1, except that the lithium ion secondary battery 1 obtained in the present comparative example was used. The relationship between the discharge capacity and the voltage is shown in FIG. 4.

TABLE 1

| | Composition (% by mass) | | | Average discharge voltage (V) | Discharge capacity (mAh/g) | Energy density (Wh/kg) |
| --- | --- | --- | --- | --- | --- | --- |
| | $FeF_3$ | $LiV_3O_8$ | Conductive auxiliary | | | |
| Example 1 | 35 | 35 | 30 | 2.73 | 229 | 625 |
| Example 2 | 60 | 10 | 30 | 2.58 | 235 | 606 |
| Example 3 | 50 | 20 | 30 | 2.62 | 250 | 655 |
| Example 4 | 40 | 30 | 30 | 2.62 | 277 | 726 |
| Example 5 | 30 | 40 | 30 | 2.68 | 252 | 676 |
| Example 6 | 40 | 40 | 20 | 2.65 | 285 | 755 |
| Comparative Example 1 | 70 | 0 | 30 | 2.54 | 209 | 530 |

It is apparent from FIG. 2 and Table 1 that the cathode material of Example 1 is equipped with a larger discharge capacity and higher energy density, compared to the cathode material of Comparative Example 1.

The cathode material of Example 1 is made of a mixture of $FeF_3$ equipped with high energy density, and $LiV_3O_8$ equipped with a lower energy density compared to $FeF_3$, so that it is anticipated that the energy density thereof becomes lower than the cathode material of Comparative Example 1 consisting only of $FeF_3$. However, in fact, the cathode material of Example 1 is equipped with a higher energy density than the cathode material of Comparative Example 1. Therefore, according to the cathode material of Example 1, it is apparent that the effect more than the sum of the effect according to the ratio of each cathode active material to $FeF_3$ and $LiV_3O_8$ may be obtained, from the viewpoint of obtaining large discharge capacity and high energy density in the lithium ion secondary battery.

From FIG. 3, it is apparent that the lithium ion secondary battery 1 using the cathode material of Example 1 is equipped with a superior cycle performance, compared to the lithium ion secondary battery 1 using the cathode material of Comparative Example 1.

From FIG. 4, the IR drop of the cathode material of Example 1 is 0.6 to 0.8 V, whereas that of the cathode material of Comparative Example 1 is 1.1 to 1.3 V. Therefore, the cathode material of Example 1 has considerably smaller IR drop compared to that of the cathode material of Comparative Example 1, so that it is apparent that a loss of the energy density in a case where the current density changes instantaneously is small, and is equipped with a superior instantaneous output characteristics.

In view of the fact that the mass ratio of $FeF_3$ to $LiV_3O_8$ is 50:50 in the cathode material of Example 1, it is apparent that the cathode material of Example 1 may obtain the effect more than the sum of the effect according to the ratio of each cathode active material to $FeF_3$ and $LiV_3O_8$ may be obtained, from the viewpoint of obtaining superior instantaneous output characteristics in the lithium ion secondary battery.

COMPARATIVE EXAMPLE 2

In the present comparative example, first, the first mixture was prepared wholly the same as in Example 1.

Next, a mixture of $LiCoO_2$ and the conductive auxiliary was prepared by pulverizing and mixing 1g of $LiCoO_2$ (made by Nippon Chemical Industrial Co., Ltd., trade name: CEL-SEED C-10N) and 0.429 g of Ketjen black, using the ball mill at the rotation frequency of 360 rpm for 1 hour.

Next, the cathode material was prepared by mixing 15 mg of the first mixture obtained in the present Comparative Example and 15 mg of the mixture of $LiCoO_2$ and the conductive auxiliary. The cathode material obtained in present Comparative Example contained $FeF_3$, $LiCoO_2$, and Ketjen black at the mass ratio of 50:20:30.

Next, the lithium ion secondary battery 1 was prepared wholly the same as in Example 1, except that the cathode material obtained in the present comparative example was used.

Figure 5:
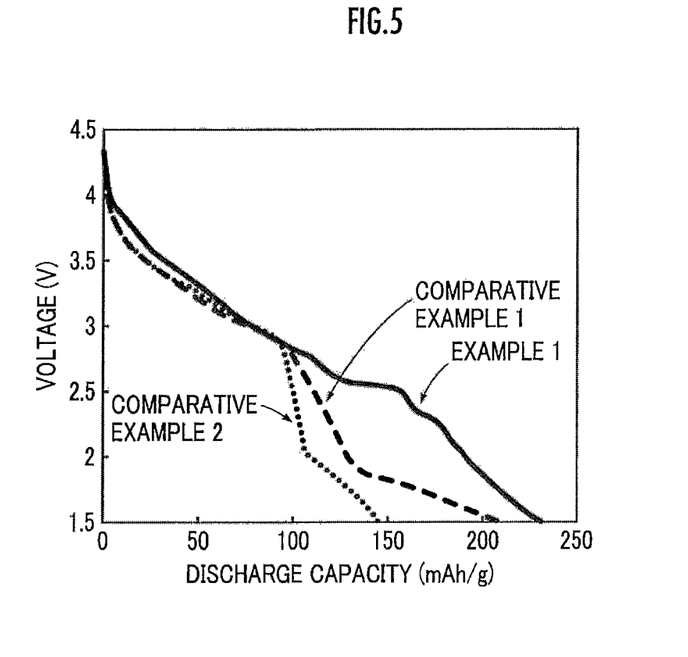
FIG. 5 is a graph showing a relationship between a discharge capacity and the voltage of the lithium ion secondary batteries obtained in the example.

Next, a discharge test was performed in an atmosphere of room temperature (25° C.), with the voltage in a range of 1.5 to 4.25 V with respect to $Li/Li^+$ and the current density of 0.1 $mA/cm^2$. The relationship between the discharge capacity and the voltage is shown in FIG. 5.

Further, the discharge test was performed wholly the same as in the present comparative example, to the lithium ion secondary battery 1 obtained in Example 1 and the lithium ion secondary battery 1 obtained in Comparative Example 1. The relationship between the discharge capacity and the voltage is shown in FIG. 5.

The cathode material of Comparative Example 2 is a mixture of $FeF_3$ and $LiCoO_2$, and $LiCoO_2$ is a cathode active material equipped with a superior instantaneous output characteristics, similar to $LiV_3O_8$. However, as is shown in FIG. 5, it is apparent that the cathode material of Comparative Example 2 has smaller discharge capacity and lower energy density, compared to the cathode material of Example 1. Therefore, it is apparent that the effect of the cathode material of Example 1 is the effect specific to the combination of $FeF_3$ and $LiV_3O_8$, among the cathode active material equipped with superior instantaneous output characteristics.

What is claimed is:

1. A cathode material for a lithium ion secondary battery, comprising $FeF_3$ and $LiV_3O_8$ as a cathode active material.

2. The cathode material according to claim 1, wherein a mass ratio of $FeF_3$ to $LiV_3O_8$ is within a range of 86:14 to 43:57.

3. The cathode material according to claim 1, further comprising a conductive auxiliary.

4. The cathode material according to claim 3, wherein the cathode material comprises
   $FeF_3$ in a range of 30 to 70% by mass, $LiV_3O_8$ in a range of 10 to 60% by mass, and the conductive auxiliary in a range of 5 to 30% by mass, and
   wherein a sum of $FeF_3$, $LiV_3O_8$ and the conductive auxiliary is 100% by mass.

5. The cathode material according to claim 4, wherein the cathode material comprises
   $FeF_3$ in a range of 30 to 60% by mass, $LiV_3O_8$ in a range of 10 to 40% by mass, and the conductive auxiliary in a range of 20 to 30% by mass, and
   wherein a sum of $FeF_3$, $LiV_3O_8$ and the conductive auxiliary is 100% by mass.

* * * * *